June 6, 1944.　　　G. W. HEINOLD　　　2,350,756
LOCK WASHER
Filed May 31, 1940　　　2 Sheets-Sheet 2

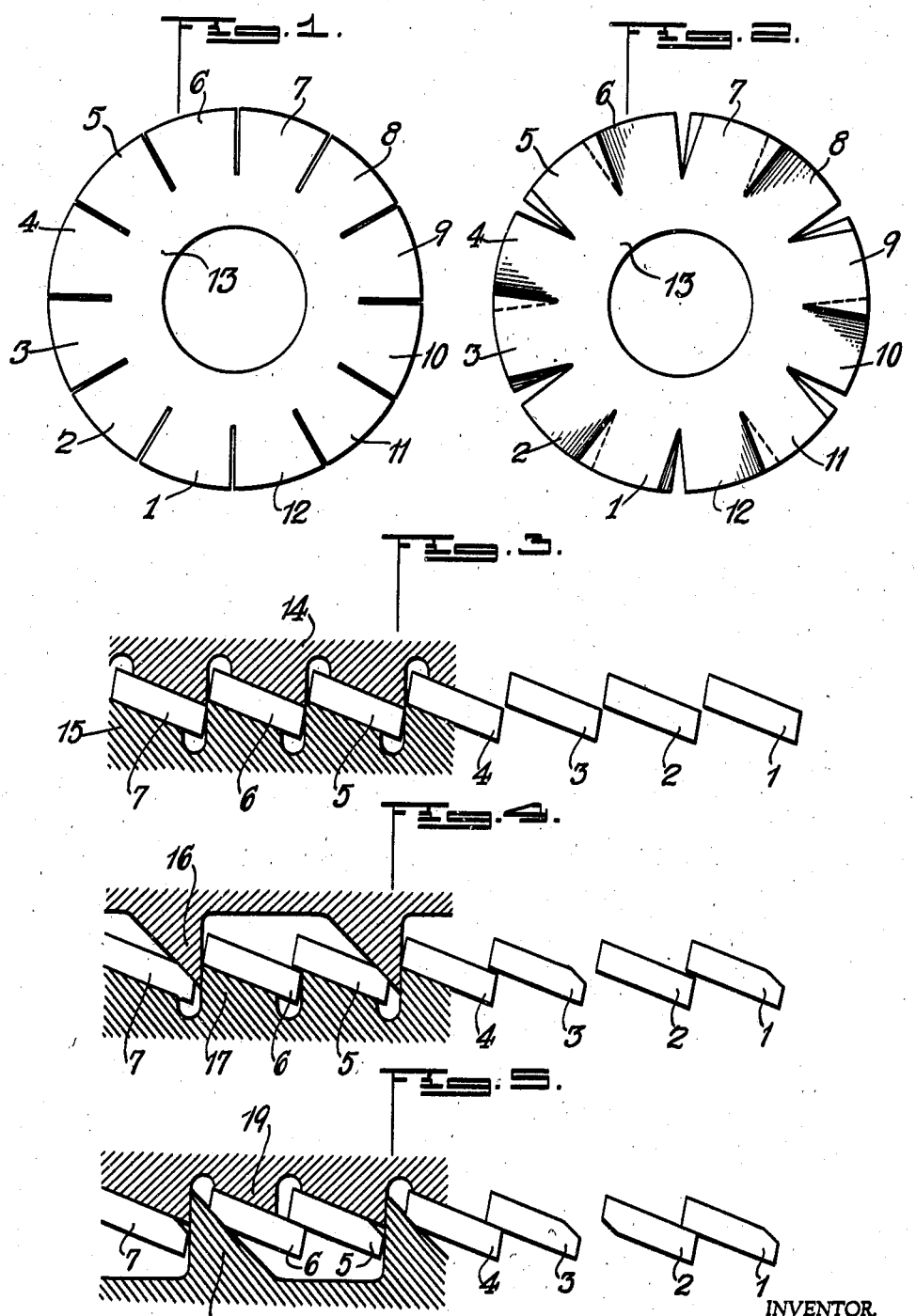

INVENTOR
GUSTAV WILLY HEINOLD.
BY Karl A. Mayr
ATTORNEY

Patented June 6, 1944

2,350,756

UNITED STATES PATENT OFFICE 2,350,756

LOCK WASHER

Gustav Willy Heinold, Leipzig, Germany; vested in the Alien Property Custodian

Application May 31, 1940, Serial No. 338,173
In Germany April 22, 1939

5 Claims. (Cl. 151—35)

The present invention relates to washers for use in combination with nuts and which washers have a combined locking and shake-proofing effect and method for producing same.

Screw-locking-devices have been proposed which comprise radial cuts for producing tooth like portions which portions are twisted and adapted to penetrate the surfaces of the nut and the work material in between which surfaces said tooth like portions are located. Washers of this type are compressed and flattened when the nut is tightened and lose their resiliency and locking effect. In order to overcome this deficiency overlapping of the teeth has been proposed whereby flattening out of the teeth is made impossible; the elasticity of washers of this type, however, is very small. Whenever the screw connection is exposed to high frequency vibrations great elasticity is desired and this cannot lastingly be obtained with the conventional lock washers described above.

It is an object of the present invention to provide a lock washer which overcomes the deficiencies of the conventional lock washers described above by providing teeth having only one edge overlapping an adjacent tooth whereas the other edge does not overlap and the tooth having an inclined portion retains full resiliency. The formation of groups of overlapping flaps facilitates fabrication of the lock washer according to the invention because broadening out of the individual teeth or flaps by the application of very high pressure and a swaging operation in order to produce overlapping as is necessary with conventional fan washers is unnecessary when making washers according to the present invention. Broadening out of the teeth in the conventional overlapping construction causes also a reduction of thickness and strength of the tooth material which reduction is not present in lock washers according to the invention. It is desired to provide as many active overlappings as possible. For this reason the individual groups of flaps should consist of more than two, preferably of three flaps.

Further and other objects of the present invention will be hereinafter set forth in the accompanying specification and claims and shown in the drawings which, by way of illustration, show what I now consider to be a preferred embodiment of my invention.

In the drawings:

Figure 1 represents a top view of a lock washer according to the invention with the radial cuts finished and before the twisting and groupwise overlapping operation.

Figure 2 is a top view of a finished lock washer according to the present invention.

Figure 3 is a diagrammatic view of the side faces of the teeth of a lock washer according to the present invention after the twisting and before the grouping and overlapping operation whereby said side faces are unwound into a plane.

Figure 4 is a diagrammatic view as in Figure 3 and after grouping and overlapping operation from one side.

Figure 5 is a diagrammatic view as in Figure 3 and after grouping and overlapping operation from both sides.

Like parts are designated by like numerals in all figures of the drawings.

Figure 6:
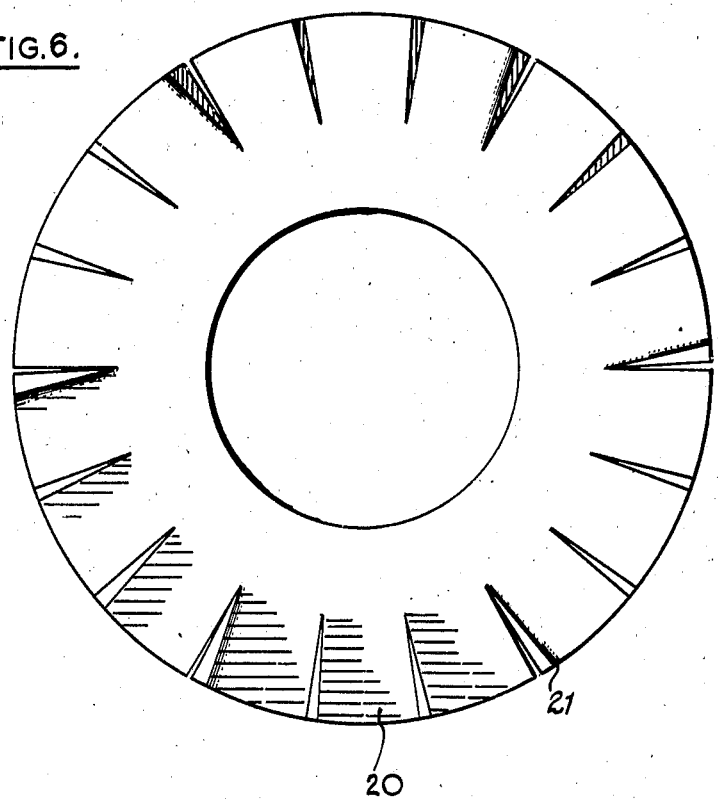
Figure 6 is a top view of a modified lock washer according to the present invention.

Referring more particularly to the drawings the washer according to the present invention comprises a solid ring portion 13 which with the teeth protruding outward as in the embodiment of the invention illustrated is located in the center and which forms the outer portion of the washer in cases where the teeth project inward. From ring portion 13 an even number of teeth, in the case illustrated 1 to 12, project outward and are grouped in pairs whereby an odd numbered tooth overlaps an even numbered tooth which is next adjacent in clockwise direction to the odd numbered tooth. Between pairs of teeth forming a group there is a wedge shaped clearance.

The washer according to the invention is produced as follows:

A disc shaped work piece is provided with radial slots and the parts between the slots are twisted by placing the disc between stamping tools 14 and 15 as diagrammatically shown in Figure 3. In the next following operation a tool provided with wedge shaped extensions 16 as diagrammatically shown in Figure 4 replaces tool 14 whereby the extensions 16 are inserted into every other radial slot. Extensions 16 push the odd numbered teeth partly over the adjacent even numbered teeth whereby the slots into which the wedge portions 16 are inserted are increased. With this method of forming the lock washer the thickness of the teeth is not reduced and formation of wrinkles which, by the way, is not of any consequence can be prevented by definitely holding the ring portion 13 in place. Due to the counterpressure of matrix 17, a ridge 21 is formed which bites into the material to which the washer is pressed later on and improves the locking effect of the washer. In order to assure true symmetrical configuration of the finished washer a third production step according to Figure 5 may be added. In this third step a tool having upwardly projecting wedge shaped portions 18 replaces the matrix 17 whereby the portions 13 are inserted from below into the same radial spaces produced before by portions 16 and the even numbered teeth are pushed under the adjacent odd numbered teeth whereby with the cooperation of the counter pressure matrix 19 the washer is completed. In case the tangential displacement is carried out in two steps symmetric formation of ridges, if any, is assured and a washer according to Figure 2 is produced whereby always two adjacent teeth forming one group fan-like overlap one another.

The overlapping portions of the pairs of teeth forming groups definitely prevent flattening of inclined segments when the washer is in actual use whereby at the same time the resiliency of the twisted segments is retained. The washer according to invention produces a compound result: rigidity is combined with resiliency and adaptability of the washer whereby also with vibrations acting on the washer from one side only definite locking action is assured during the whole life of the washer.

Figure 7:
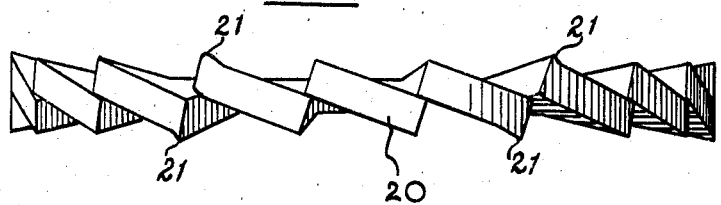
Figure 7 is a side elevational view of the lock washer shown in Fig. 6.

Without departing from the present invention the lock washer according to the invention may be made cone shaped and/or with inwardly projecting segments. Groups of three teeth, as shown in Figures 6 and 7, are preferably provided whereby both lateral edges of the center tooth are overlapped. With this embodiment of the invention greater rigidity of the washer against compression is assured.

While I believe the above described embodiments of my invention to be preferred embodiments, I wish it to be understood that I do not desire to be limited to the exact details of design, method and construction shown and described, for obvious modifications will occur to a person skilled in the art.

I claim:

1. As an article of manufacture, a lock washer having a ringlike portion, prongs projecting therefrom in circumferentially spaced groups of three, the prongs being inclined with respect to the median plane of said ringlike portion, the side prongs of each group being deflected toward the middle prong and underlapping and overlapping corresponding opposite side edges of the middle prong.

2. As an article of manufacture, a lock washer according to claim 1 wherein the remaining edge of the side prongs is formed with a ridge projecting outwardly from the inclined surface of the side prong.

3. As an article of manufacture, a lock washer according to claim 1 wherein the side edges of the middle prong are substantially radial whereas the side edges of the side prongs deviate inwardly from the radial direction, and wherein the overlapping is limited to relatively narrow portions of the side edges of the prongs.

4. As an article of manufacture, a lock washer according to claim 1 wherein the side edges of the middle prong are substantially radial whereas the side edges of the side prongs deviate inwardly from the radial direction, and wherein the overlapping is limited to relatively narrow portions of the side edges of the prongs, ridges formed on the exposed corners of the inner edges of the side prongs which overlap the middle prong whereby the ridged portions of the side prongs are supported by the middle prong under compressive stress upon the washer whereby distortion of the side prongs by such pressure is substantially reduced.

5. As an article of manufacture, a lock washer having a ring-like portion, inclined prongs projecting therefrom and formed into circumferentially spaced groups, each group comprising a prong having radially extending side edges and another prong along side of the first mentioned prong, said other prong having a side edge deviating from the radial direction and overlapping an adjacent side edge of the first mentioned prong.

G. WILLY HEINOLD.